United States Patent
Neufeld et al.

(10) Patent No.: US 7,017,676 B2
(45) Date of Patent: Mar. 28, 2006

(54) SUPPORT ASSEMBLY FOR A FLEXIBLE LINE OF AN AGRICULTURAL IMPLEMENT

(75) Inventors: George Neufeld, Saskatoon (CA); Stanley W. Ylioja, Outlook (CA); Phillip A. Reiber, Saskatoon (CA); Paul D. Minto, Saskatoon (CA)

(73) Assignee: CNH Canada, Ltd., Racine, WI (US)

( * ) Notice: Subject to any disclaimer, the term of this patent is extended or adjusted under 35 U.S.C. 154(b) by 0 days.

(21) Appl. No.: 10/932,224

(22) Filed: Sep. 1, 2004

(65) Prior Publication Data
US 2006/0042809 A1 Mar. 2, 2006

(51) Int. Cl.
*A01B 63/00* (2006.01)

(52) U.S. Cl. ............... 172/452; 172/776; 248/75

(58) Field of Classification Search ........... 172/254, 172/272, 315, 316, 645, 647, 662, 663, 677, 172/679, 311, 452, 776; 280/421; 248/75
See application file for complete search history.

(56) References Cited

U.S. PATENT DOCUMENTS

| | | | | |
|---|---|---|---|---|
| 2,619,888 A | * | 12/1952 | Young et al. .......... | 280/421 |
| 2,673,093 A | | 3/1954 | Silver et al. | |
| 2,735,348 A | | 2/1956 | Taylor | |
| 2,879,020 A | | 3/1959 | Wheeler | |
| 2,978,217 A | * | 4/1961 | Gunderson .......... | 248/75 |
| 3,388,927 A | | 6/1968 | Von Grunberg et al. | |
| 3,986,642 A | | 10/1976 | Selvia et al. | |
| 4,002,357 A | * | 1/1977 | Bennett .......... | 285/61 |
| 4,234,012 A | * | 11/1980 | Schupback .......... | 137/899.1 |
| 4,238,096 A | * | 12/1980 | Dvorachek .......... | 248/75 |
| 4,358,082 A | | 11/1982 | Reeves | |
| 4,658,854 A | | 4/1987 | Hopkins et al. | |
| 4,775,286 A | | 10/1988 | Gillette et al. | |
| 4,836,740 A | | 6/1989 | Wagner | |
| 5,082,217 A | * | 1/1992 | Parker et al. .......... | 248/75 |
| 5,108,253 A | | 4/1992 | Kobayashi et al. | |
| 6,378,279 B1 | * | 4/2002 | Smith et al. .......... | 56/15.5 |
| 6,561,535 B1 | * | 5/2003 | Paluch et al. .......... | 280/491.2 |
| 6,663,134 B1 | | 12/2003 | Paluch et al. | |
| 6,752,360 B1 | * | 6/2004 | Bennett .......... | 248/68.1 |

FOREIGN PATENT DOCUMENTS

DE 3739378 A1 6/1989

* cited by examiner

*Primary Examiner*—Thomas B. Will
*Assistant Examiner*—Toni Newville
(74) *Attorney, Agent, or Firm*—Rebecca Henkel

(57) ABSTRACT

A support assembly is configured to carry a series of flexible lines associated with operation of an agricultural implement. The agricultural implement generally includes a main frame bar pivotal about a platform. The support assembly includes a mounting bracket, a support arm and a holder assembly. The mounting bracket is pivotally coupled about a vertical axis to the agricultural implement. The support arm is pivotally connected at one end to the agricultural implement, and connected at the other end to the holder assembly. The support assembly is configured to hold the plurality of flexible lines above the platform as the main frame bar pivots about the platform of the implement.

20 Claims, 5 Drawing Sheets

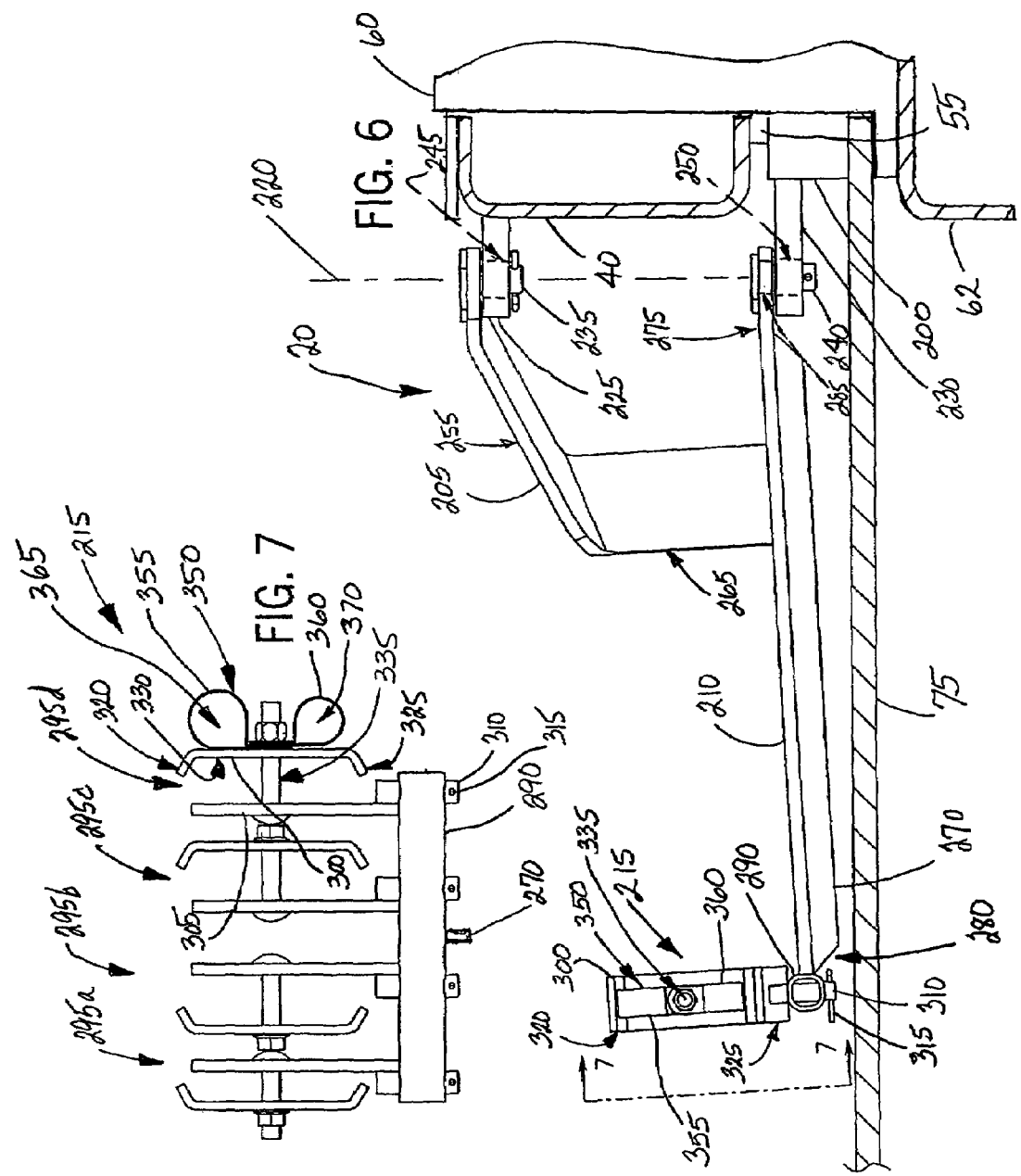

SUPPORT ASSEMBLY FOR A FLEXIBLE LINE OF AN AGRICULTURAL IMPLEMENT

RELATED APPLICATIONS

This application relates to co-pending U.S. patent application Ser. No. 10/932,178 entitled "Holder Assembly," filed simultaneously with this application, and U.S. patent application Ser. No. 10/932,176 entitled "Assembly for and Method of Constraining a Flexible Line of an Agricultural Implement," filed simultaneously with this application, hereby incorporated herein by reference in their entirety.

FIELD OF INVENTION

The invention relates to a support assembly for a flexible line and, more particularly, to an assembly configured to pivotally support a series of flexible lines associated with an agricultural implement.

BACKGROUND OF INVENTION

Various types of agricultural implements have been developed that can be linked via an implement tongue assembly to a tractor hitch or other type of tow vehicle to facilitate different tasks including, for example, seeding, fertilizing and tilling. Hereinafter, unless indicated otherwise, the background of the invention and the present invention will be described in the context of an exemplary planting implement.

An important fact in accessing the value of a planting implement is how quickly the implement can accomplish the task of the implement. The task speed of the implement can be increased by reducing the number passes required to perform the implement's task for a field. Certain known planting implements are configured to expand to operating field widths of 40-feet or more. Unfortunately, such expansive widths cannot be tolerated during planter transportation, storage, and egress of the implements to and from many agricultural fields. In particular, many farmers use commercial roadways to transport their planting implements to and from the fields, and essentially all roadways are not designed to accommodate expansive planting implements. The industry has developed planting implements that are operable to fold to and from a retracted configuration between transport and intended use.

One certain folding type planting implement includes a single implement tool bar centrally mounted for pivotal movement on a wheel supported carrier platform where the single arm is pivotable about the mount so that half of the bar extends over the tongue assembly and is a supportable thereby and the other half of the bar extends away form the tractor behind the chassis. The tongue assembly has to be long enough to accommodate the implement bar length plus some clearance so as to allow a tractor linked to the tongue assembly to turn left and right. For example, where the planting implement operating width is 40-feet, the tongue assembly generally has to be greater than 20-feet long.

To ensure that planted along the entire edge of a field, a farmer typically starts seeding the field by first traveling around the edge of the field with a seeding implement at lease once and often two or more times along adjacent consecutively smaller paths prior to traveling in parallel rows through field. These field edge paths are generally referred to in the industry as headland passes. Performing one or more headland passes about a field edge prior to performing parallel passes provides a space for turning the tractor an implement around between parallel passes while still covering the entire space along the field edge. However, headland passes include driving over field sections that have already been seeded, crushing the seeds or growing plants that pass over and reducing overall field production. As known in the industry, farms routinely attempt to reduce the number of headland passes required in a field.

The number of headland passes required to facilitate field coverage is related to the turning radius of a tractor and planter implement combination and the combination turning radius is directly related to the length of the tongue assembly coupling the planting implement with the tractor. Recognizing that a short tongue assembly during planting implement operation reduces the number of headland passes and increases efficiency, and a long tongue assembly is desirable to accommodate pivotal and scissors type implement configurations, the industry has developed telescoping tongue assemblies driven by a hydraulic cylinder to extend and accommodate implement transport, and to retract and provide a minimal turning radius during operation.

Typically, planting implements do not come equipped with their own power units. Most farmers employ many different implements, and a separate power unit for each implement would be too costly. Instead, tractors are typically constructed with power capacities sufficient to transport an implement as well as provide power to operate the implement. In particular, a tractor in tow of a planting implement would provide hydraulic fluid to power any hydraulic cylinders required to rotate the implement between transport and functional positions, to raise and lower support wheels, to raise and lower an implement tool bar, to extend and retract the telescopic tongue assembly and to control the hydraulic locking assemblies. In addition, the tractor would also provide electrical power to the hydraulic valves (e.g., solenoid valves), any blower mechanisms for product conveyance to the row metering units and to any other devices requiring electrical power (e.g., tail lights, sensors, etc.).

To provide power to the planting implement, a tractor typically comes equipped with one or, in most cases, a plurality of power or power source ports are positioned proximate a hitch receiving assembly of the tow vehicle, and the planting implement is equipped with one or more power receiving ports. Power cables are then provided to link associated ports (i.e., hydraulic to hydraulic, electrical to electrical, etc.) together. Generally, the planting implement pivots about the hitch receiver assembly with respect to the tractor and therefore the power cables are constructed to flex and accommodate a degree of pivoting consistent with a minimum tractor turning radius.

As with most assemblies that include flexible lines such as power cables, the flexible lines of the planting implement need to be protected from damage. Otherwise, for example, a severed hydraulic fluid line can prevent the planting implement from being rotated to a suitable position for transportation along most roadways. Protecting the power cables is particularly difficult with telescoping tongue assemblies.

U.S. Pat. No. 6,561,535 discloses an agricultural implement employing a sheath member mounted to the tongue assembly to receive power cables from the tractor. The sheath member defines a passageway that restricts bending in the power cables to a single plane. However, when the toolbar planter was folded into and out of transport, the hoses drop down and drag on the toolbar deck. This wear and tear on the hoses increases a potential for failure over time.

There is thus a need for a support assembly that minimizes wear and tear on the flexible lines associated with operation of the implement, and yet positions the flexible lines correctly during telescopic movement of the tongue assembly and/or pivoting/rotating movement of the tool bar assembly between transport and operation of the agricultural implement.

SUMMARY OF THE INVENTION

The present invention provides a support assembly to carry a series of flexible lines associated with operation of an agricultural implement. The agricultural implement generally includes a main frame bar pivotal about a platform between an operative position and a transport position. The support assembly includes a mounting bracket, a support arm and a holder assembly. The mounting bracket assembly is pivotally coupled about a vertical axis to the agricultural implement. The support arm is pivotally coupled about the vertical axis to the mounting bracket. The holder assembly is connected to the support arm. The support assembly is configured to carry the plurality of flexible lines above the platform as the main frame bar pivots about the platform of the agricultural implement.

In a preferred embodiment of the support assembly, the mounting bracket is pivotally mounted by a pin to the main frame bar. The preferred mounting bracket is pivotally mounted by a pin to the main frame bar. The mounting bracket is attached in support of the support bar from the platform. The preferred mounting bracket includes an upper generally horizontal aligned portion and a lower generally horizontal aligned portion relative to the upper generally horizontal aligned portion, and a generally vertically align portion therebetween, the support bar attached at the lower generally horizontal aligned portion. The generally vertical aligned portion of the mounting bracket limits rotation of the support assembly relative to the main frame bar. The support arm generally includes a first end and a second end. The support assembly further includes a mount plate located above the platform and pivotally attached to the first end of the support arm. The holder assembly is attached at the second end of the support arm.

The preferred holder assembly generally includes at least one swivel assembly configured to hold one or more of the plurality of flexible lines to the support assembly. The holder assembly further includes a series of swivel assemblies. Each of the series of swivel assemblies is configured to independently pivot with respect to others in the series swivel assemblies. The holder assembly further includes a holder mount bar attached at the support bar, and each of the swivel assemblies is supported on the holder mount bar. Each of the swivel assemblies includes a swivel post received by, and pivotal with respect to, the holder mount bar. Each of the swivel assemblies further includes a bracket support attached at the swivel post; and a bracket attached by a fastener to the bracket support. The bracket receives one or more of the series of flexible lines against the bracket support.

In another embodiment, the present invention provides an agricultural implement that includes a main frame supported on one or more wheel assemblies. The main frame is in support of a rotatable main frame bar configured to move with respect to a platform between a stowed position and an extended position for planting operation in a agricultural field. The agricultural implement further includes a series of flexible lines associated with operation of the agricultural implement. The agricultural implement further includes a support assembly to carry the series of flexible lines. The support assembly generally includes a mounting bracket, a support arm, and a holder assembly connected to the support arm and in support of the series of flexible lines. The support assembly is configured to carry the series of hoses from the platform as the main frame bar pivots about the platform of the agricultural implement.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 6 illustrates a side elevation view of the support assembly along line 6—6 in FIG. 5.

FIG. 7 illustrates a side elevation view of the holder assembly of the support assembly along line 7—7 in FIG. 6.

DETAILED DESCRIPTION OF THE PREFERRED EMBODIMENTS

Figure 1:
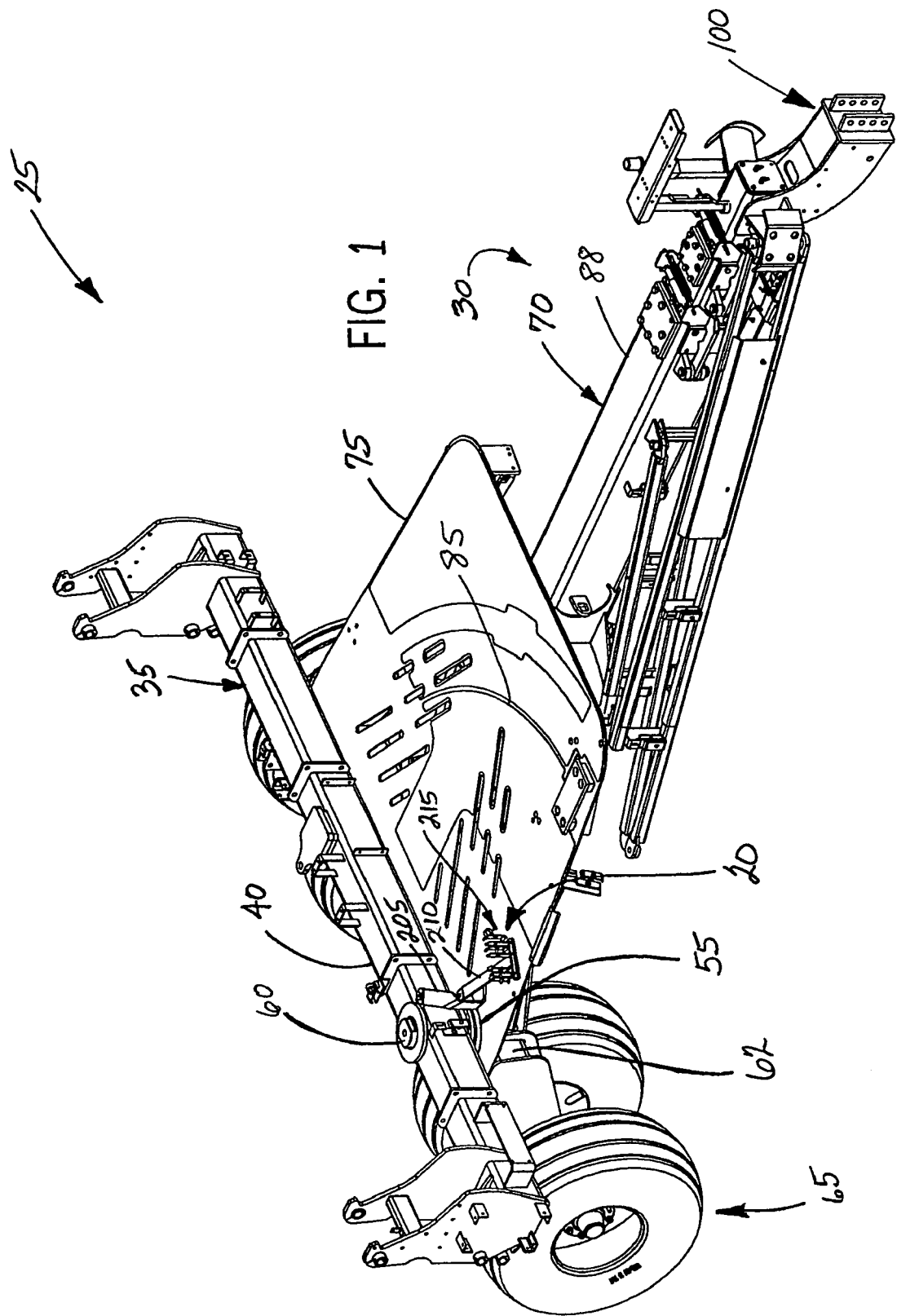
FIG. 1 illustrates an isometric view of a support assembly in combination with a main frame bar and a telescoping tongue assembly of an agricultural implement in accordance with the present invention.
Figure 2:
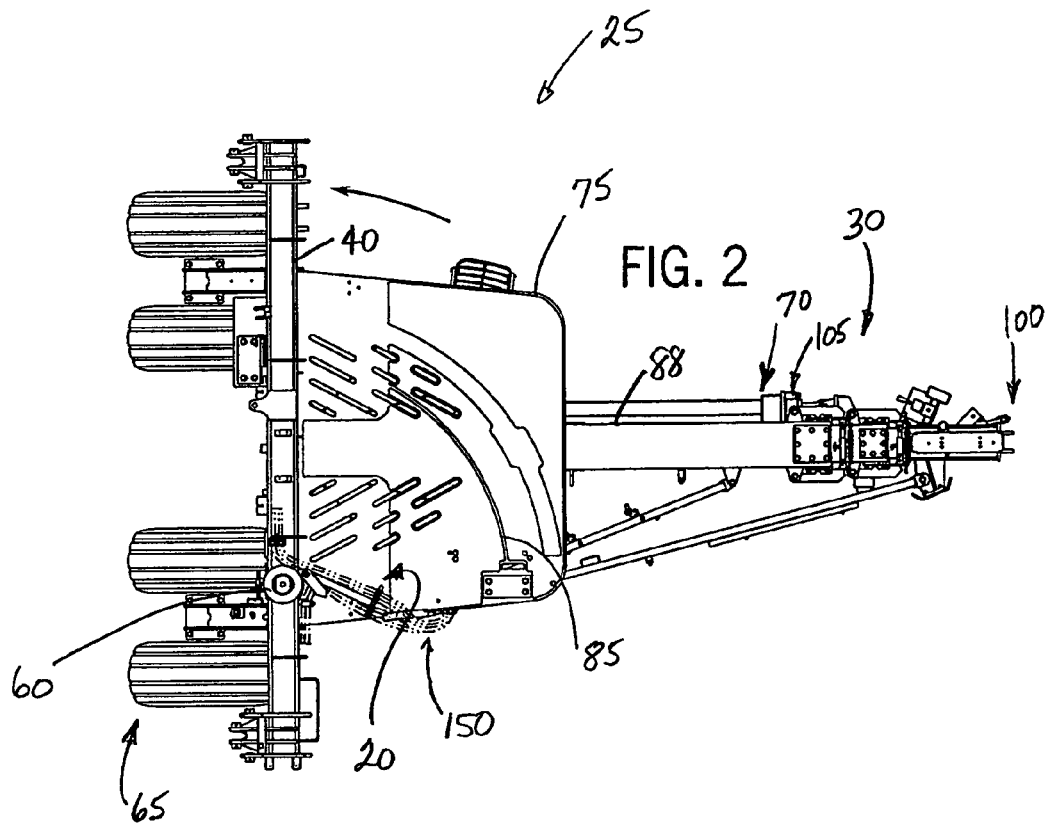
FIG. 2 illustrates a top view of the support assembly carrying a series of flexible lines on the agricultural implement of FIG. 1, the main frame bar in an operative position and the telescoping tongue assembly in an operative position.

FIGS. 1 and 2 illustrate a support assembly 20 in combination with a frame assembly 25 of an agricultural implement in accordance with the present invention. The preferred agricultural implement is a planting implement as described in U.S. Pat. No. No. 6,663,134 entitled "Planter Hitch Apparatus," filed Jan. 31, 2002, and hereby incorporated herein by reference in its entirety.

As illustrated in FIG. 1, the frame assembly 25 of the preferred planting implement generally includes a carrier frame assembly 30, a main frame assembly 35 and an implement assembly (not shown). As its label implies, the carrier frame assembly 30 generally includes components configured to facilitate transport or carrying of the main frame assembly 35 and the implement assembly (not shown). Similarly, as their labels imply, the main frame assembly 35 generally includes components configured to support any of several different implement assemblies. The implement assembly (not shown) includes components (e.g., planting devices) configured in a known manner to carry out a specific agricultural processes corresponding to a specific agricultural implement. For instance, the components that comprise the implement assembly may be used for tilling, fertilizing, planting, etc. The main frame assembly 35 is mounted to the carrier frame assembly 30 and the implement assembly (not shown) is mounted to the main frame assembly 35. The support assembly 20 of the present invention generally resides in the main frame assembly 35 in relation to carrier frame assembly 30 and, more particularly, on the main frame bar (discussed below) that forms part of the main frame assembly 35.

Still referring to FIG. 1, the main frame assembly 35 generally includes, among other components, a main frame bar 40, a latching assembly (not shown) and a pivot plate 55. The pivot plate 55 is mounted to an undersurface of the main frame bar 40 about one-fourth the length of the main frame bar 40 from a first end thereof and forms a downwardly opening pivot receiving aperture (not observable in the FIGS. 1–4) for receiving a pivot pin 60 of the carrier frame assembly 30. A latch assembly (not shown) cooperates with the carrier frame assembly 30 to lock the main frame assembly 35 in either an operating position (see FIGS. 1 and 2) or a transport position (see FIG. 4).

Referring to FIG. 1, the carrier frame assembly 30 generally includes a cross bar 62, wheel assemblies 65, a telescoping tongue assembly 70 and a platform 75. The preferable telescoping tongue assembly 70 is a two stage assembly and is described in more detail later. The platform 75 is essentially a rigid flat bed plate structure that is secured to a top surface of the cross bar 62. Among other features, the platform 75 forms a track runner 85 on a top surface. The pivot pin 60 generally extends through an opening (not shown) in the platform 75.

Referring to FIGS. 1–4, the track runner 85 forms an arc about the pivot pin 60. The track runner 85 is dimensioned so as to securely support the main frame bar 40 thereabove. The entire main frame bar 40 and components attached thereto (not shown) are moveable between the operating position illustrated in FIGS. 1 and 2 to the transport position illustrated in FIG. 4 and to any intermediate position (See FIG. 3) therebetween by simply rotating the main frame bar 40 about the pivot pin 60. As indicated above, when in either the transport or operating positions, the latch assembly cooperates to lock the main frame bar 40 to the carrier assembly 30 in a manner that reduces movement during transport. Any means for rotating the main frame bar 40 about the pin 60 may be employed.

The main frame assembly 35 and the main frame bar 40 are shown in the operating position as illustrated in FIGS. 1 and 2, consistent with reducing the number of required headland passes needed to perform an agricultural task for an entire field. However, as FIG. 4 illustrates, in order to accommodate a long configuration of the main frame bar 40 of the main frame assembly 35 in the transport position, the telescoping tongue assembly 70 has to be extended.

Figure 4:
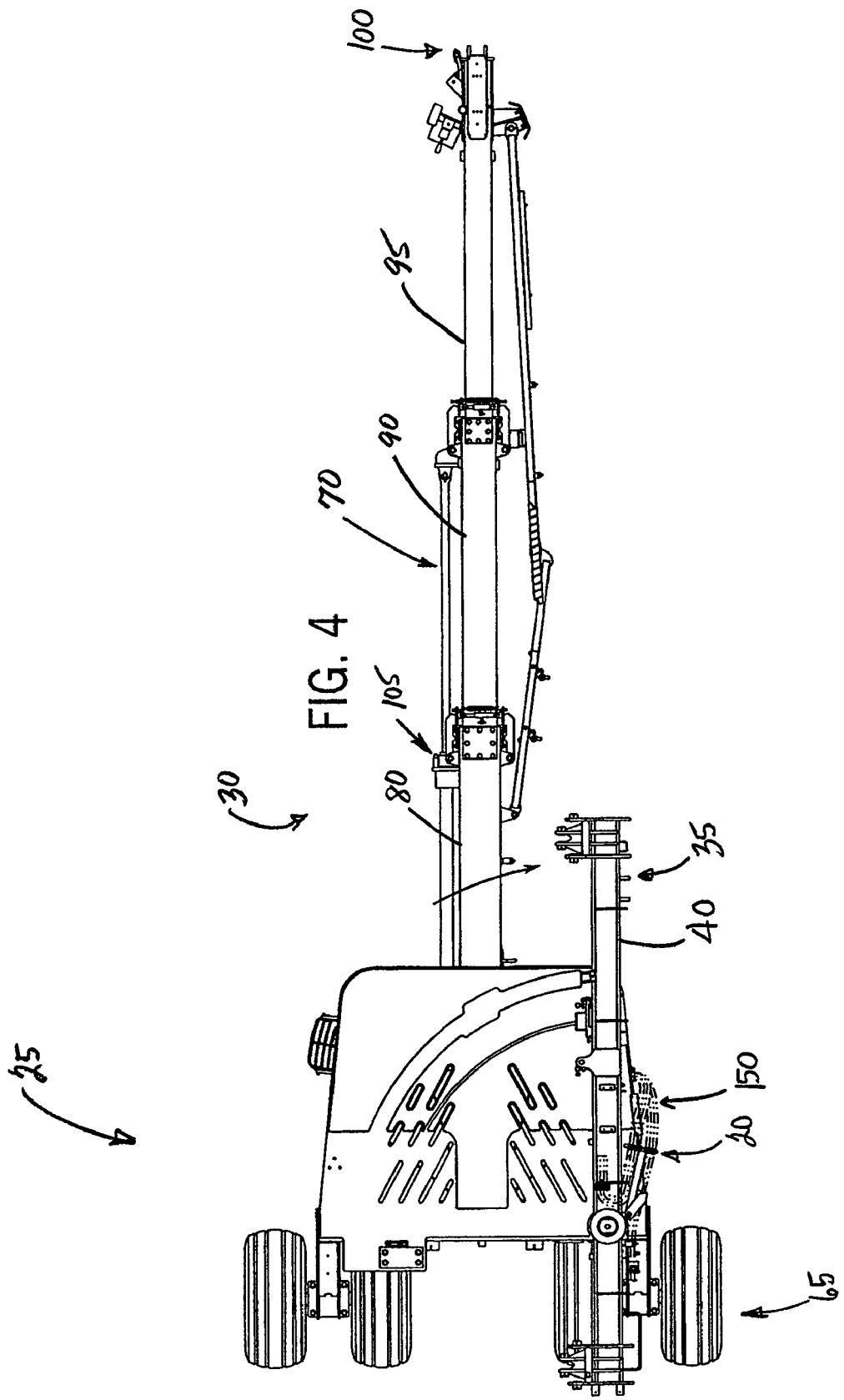
FIG. 4 illustrates a top view of the support assembly carrying the series of flexible lines on the agricultural implement of FIG. 1, the main frame bar in a stowed position and the telescoping tongue assembly in an extended position for transport.

Referring now to FIG. 4, the exemplary telescoping tongue assembly 70 generally includes a first tongue arm 88, a second tongue arm 90, and a third tongue arm 95, a hitch assembly 100, and a first hydraulic tongue cylinder 105, and a second interior hydraulic tongue cylinder (not shown) located in the interior of the third tongue arm 95, respectively. The exemplary first, second, and third tongue arms 88, 90 and 95, respectively, are tubular shaped and of dimension such that the third tongue arm 95 received within the second tongue arm 90 with minimal clearance, and the second tongue arm 90 is dimensioned to be received with minimal clearance within the first tongue arm 88. It should also be appreciated that additional stages may be added to the tongue assembly 70 by providing additional arms and associated hydraulic cylinders to the tongue assembly 70.

Assuming that tongue assembly 70 is locked in a completely retracted position (FIGS. 1 and 2), in order to unlock the latch assemblies and extend the tongue assembly 70, hydraulic fluid is pumped from a hydraulic source at a tow vehicle (not shown) in a known manner to extend the telescoping tongue assembly 70. The pumped hydraulic fluid causes the first hydraulic cylinder 105 and the second enclosed cylinder (not shown) to extend and drive corresponding tongue arms 90 and 95 toward extended positions as illustrated in FIGS. 3 and 4.

Figure 3:
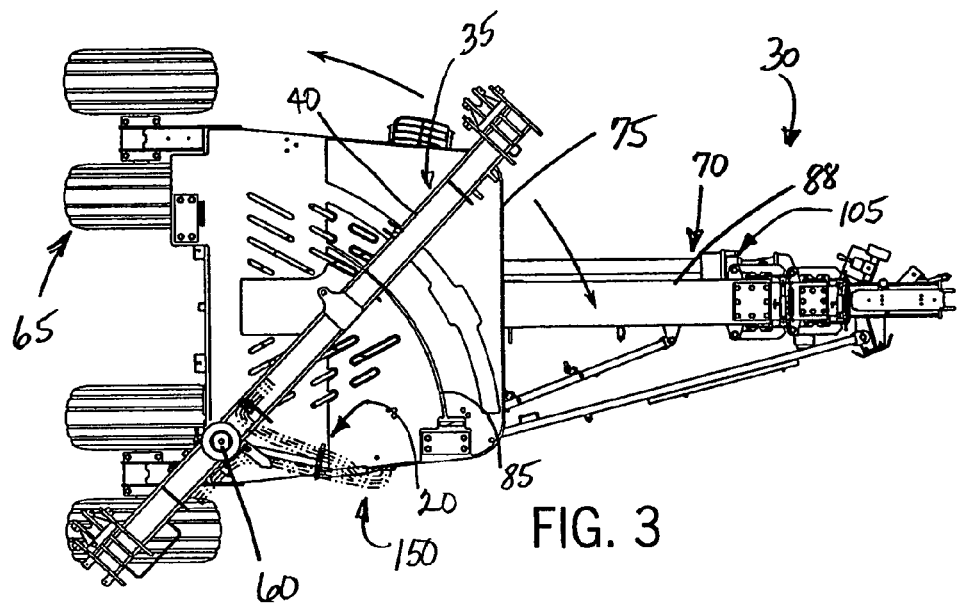
FIG. 3 illustrates a top view of the support assembly carrying the series of flexible lines on the agricultural implement of FIG. 1, the main frame bar in a transitional position.

Referring to FIGS. 2–4, the support assembly 20 is generally configured to secure and to support a series of flexible lines 150, e.g., hoses, cables, harnesses, etc., associated with operation of the planting implement. The series of flexible lines 150 (illustrated in dashed lines) preferably extend along the tongue assembly 70 of the implement. The series of flexible lines 150 (e.g., hoses, electrical harness, electrical cables, etc.) are connected to various types of mechanisms (e.g., electrical, hydraulic, pneumatic, etc.) or sensors (not shown) associated with miscellaneous operations of the implement, including the hydraulic cylinders associated with movement of the main frame bar 40 and the telescoping tongue assembly 70.

Figure 5:
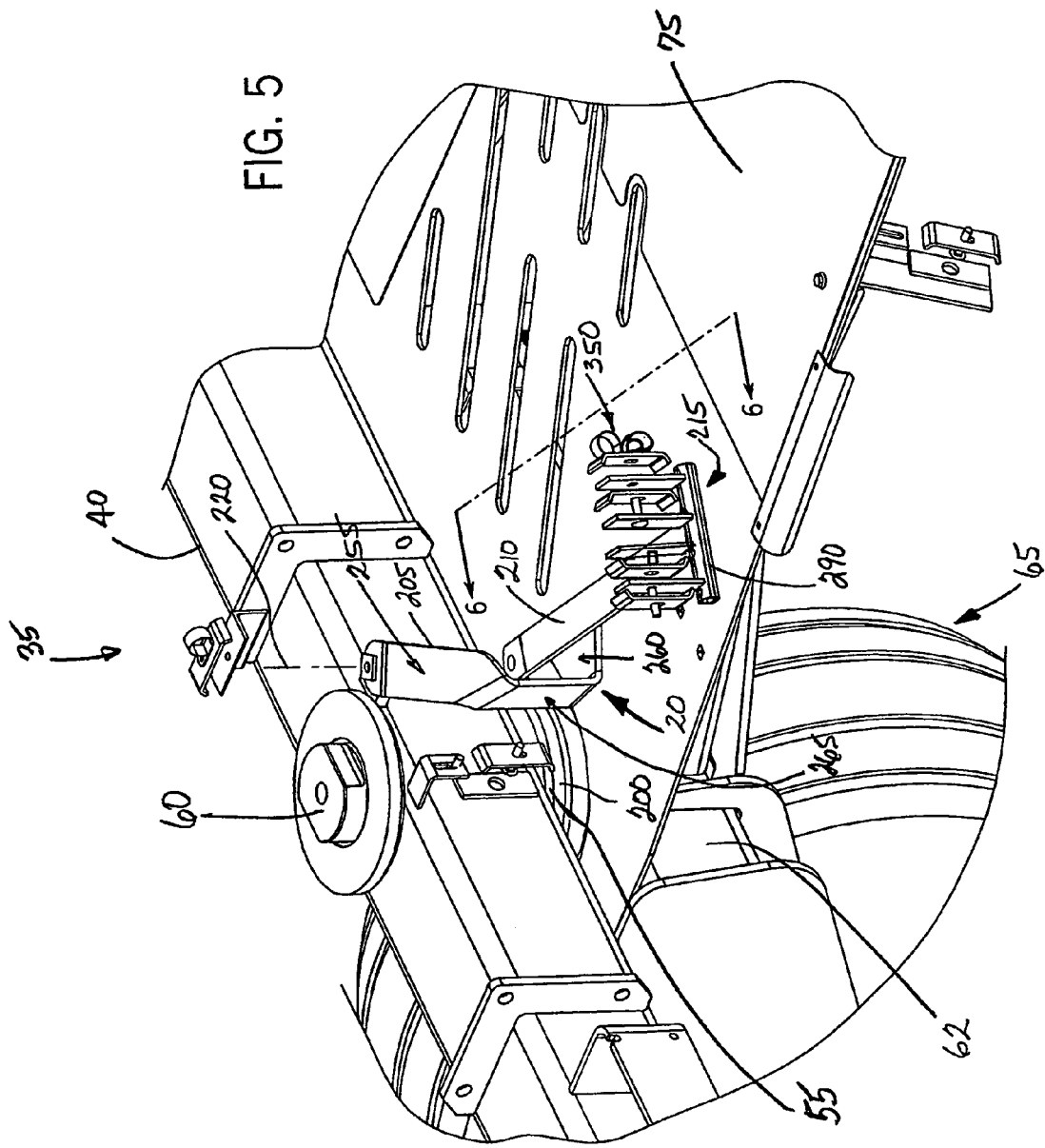
FIG. 5 illustrates a detailed isometric view of the support assembly of FIG. 1.

Referring to FIGS. 1–4, as the main frame bar 40 and the tongue assembly 70 move between various positions, the support assembly 20 pivots in a manner that positions the series of flexible lines 150 in a desired manner on the implement. Referring now to FIGS. 5–7, the preferred support assembly 20 generally includes a mount plate 200, a mounting bracket 205, a support arm 210, a holder assembly 215. The mount plate 200 is generally attached above the platform 75 of the carrier frame assembly 30. The pivot plate 55 is generally located above the mount plate 200 in pivotal support of the main frame bar 40.

As illustrated in FIG. 6, the mounting bracket 205 is pivotally coupled about a vertical axis 220 to a first mount 225 and a second mount 230. The mounting bracket 205 is pivotally mounted by a first pin 235 and a second pin 240. The first mount 225 is fixedly attached to the main frame bar 40 and includes an opening 245 to receive the first pin 235. The second mount 230 is fixedly attached to the mount plate 200 and includes an opening 250 to receive the second pin 240. The first and second pins 235 and 240 pivotally support the mounting bracket 205 and the support arm 210 to the carrier assembly 30. Alternatively, the mounting bracket 205 can be pivotally coupled by a single pin extending between the first mount 225 and the second mount 230.

Referring now to FIGS. 5 and 6, the exemplary mounting bracket 205 generally includes a first generally horizontal aligned portion 255 pivotally coupled to the first mount 225, a second generally horizontal aligned portion 260 attached at the support arm 210, and a generally vertical aligned portion 265 extending between the first and second generally aligned portions 255 and 260. The mounting bracket 205 is generally configured to enhance strength and to protect the support assembly as it carries the flexible lines 150 (See FIGS. 2–4).

As illustrated in FIG. 6, the support arm 210 is pivotally coupled to support the series of flexible lines 150 (See FIGS. 2–4) from the platform 75. The preferred support arm 210 is generally an elongated bar having a gusset 270 and a first end 275 and a second end 280. The first end 275 of the support arm 210 includes an opening 285 to receive the second pin 240 pivotally coupling the support arm 210 about the vertical axis 220 to the second mount 230. The holder assembly 215 is attached at the second end 280 of the support arm 210.

Referring now FIGS. 5–7, the holder assembly 215 of the support assembly 20 is generally configured to hold the series of flexible lines 150 (See FIGS. 2–4) above the platform 75 in segregated positions as the main frame bar 40 and the telescoping tongue assembly 70 move during operation of the implement. As illustrated in FIG. 7, the exemplary holder assembly 215 generally includes a holder mount bar 290 in support of a series of swivel mount assemblies 295a–d. The holder mount bar 290 is attached to the second end 280 of the support bar 210 (See FIG. 6). The holder mount bar 290 includes a series of openings (not shown) to receive the swivel mount assemblies 290. The preferred holder mount bar 290 is tubular-shaped, but the type (e.g., rod, bar, etc.) of the holder mount bar 290 can vary. Alternatively, the holder mount bar 290 can be pivotally attached to the second end 280 of the support arm 210.

Still referring to FIG. 7, the series of swivel mount assemblies 295a–d each are operable to independently pivot relative to the holder mount bar 290. The series of swivel mount assemblies 295a–d are generally identical in construction and are interchangeable. Thus, the swivel mount assembly 295d will be described for sake of explanation, with an understanding that the other swivel mount assemblies 295a–c are similar in construction.

The preferred swivel mount assembly 295d includes a bracket 300 in combination with a bracket support 305 mounted on a swivel post 310 mounted in the associated opening in the holder mount bar 290. The swivel post 310 is secured to the holder mount bar 290 by a latch pin 315. The preferred bracket 300 is a plate structure having a first angled end 320 and a second angled end 325, and a body portion 330 therebetween. The body portion 330 includes an opening (not shown) to receive a fastener 335 (e.g., bolt and nut) coupling the bracket 300 to the bracket support 305. The preferred bracket support 305 is a plate structure that includes an opening to receive the fastener 335 coupling the bracket 300 to the bracket support 305.

Still referring to FIG. 7, the swivel mount assembly 295d can further include a hose coupling 350 attached by the fastener 335 to the swivel mount assembly 295d. The exemplary hose coupling 350 generally includes two plate structures 355 and 360 having curvilinear-shapes that define a first opening 365 and a second opening 370. Each first and second opening 365 and 370 of the hose coupling 350 is generally configured to receive one or more of the series of flexible lines 150 therethrough, thereby providing an additional means of supporting the flexible lines 150 in a manner that also segregates one or more flexible lines 150 in an position relative to others in the series of flexible lines 150 associated with the implement.

In operation, as the main frame bar 40 and the telescoping tongue assembly 70 move between various positions associated with operation of the implement, the support assembly 20 pivots and keeps the series of flexible lines 150 from contacting the platform 75. The support assembly is operable to pivot, and each of the swivel assemblies 295a–d moves independently that in combination allow for a smooth transition of the flexible lines 150 between the various positions of the main frame bar 40 and the tongue assembly 70. The pivotal support assembly 20 thus allows the flexible lines 150 to stay positioned correctly during the transition between positions of the main frame bar 40 and the tongue assembly 70, with reduced opportunities for wear and tear and/or snagging.

Many changes and modifications could be made to the invention without departing from the spirit thereof. The scope of these changes will become apparent from the appended claims.

We claim:

1. An agricultural implement for operation in a field, comprising:
    a frame assembly that includes a main frame bar configured to pivot about a pivot pin extending from a platform between a stowed position for transport and an extended position for operation in the field, the platform including a track to support the main frame bar as it moves between the stowed position and the extended position;
    at least one flexible lines associated with operation of the agricultural implement;
    a support assembly pivotally coupled about a vertical axis to the frame assembly, the support assembly comprising:
        a mounting bracket having an upper portion, and a lower portion, the upper portion pivotally coupled at the main frame bar to pivot about a vertical axis with respect to the main frame bar;
        a mount plate located between the main frame bar and the platform;
        an elongated support arm having a first end pivotally coupled at the mount plate to pivot about the vertical axis with respect to the mount plate, and attached at a different location at the lower portion of the mounting bracket; and
        a holder assembly connected at a second end of the support arm opposite the first end, the holder assembly configured to receive the plurality of flexible lines,
    wherein the support assembly carries the plurality of hoses from the platform as the main frame bar pivots about the platform.

2. The agricultural implement as recited in claim 1, wherein the mounting bracket is pivotally mounted by a generally vertically aligned pin to the main frame bar.

3. The agricultural implement as recited in claim 1, wherein the mounting bracket is attached in support of the support arm from the platform.

4. The agricultural implement as recited in claim 1, wherein the first end of the support arm includes an opening to receive a pin pivotally coupling the support arm to pivot about the vertical axis with respect to the mount plate.

5. The agricultural implement as recited in claim 4, further comprising a mount extending from the main frame and having an opening extending therethrough configured to receive a generally vertically aligned pin pivotally coupling the upper portion of the mounting bracket about the vertical axis at the mount.

6. The agricultural implement as recited in claim 1, wherein the upper and lower portions of the mounting bracket are generally horizontal aligned, and wherein a generally vertically aligned portion extends therebetween.

7. The agricultural implement as recited in claim 6, wherein the generally vertical aligned portion of the mounting bracket limits rotation of the support assembly about the vertical axis relative to the main frame bar.

8. The agricultural implement as recited in claim 1, wherein the holder assembly includes at least one swivel assembly configured to hold one or more of the plurality of flexible lines to the support assembly.

9. The agricultural implement as recited in claim 1, wherein the holder assembly includes a series of swivel assemblies, wherein each of the swivel assemblies configured to independently pivot with respect to others in the series swivel assemblies.

10. The agricultural implement as recited in claim 9, wherein the holder assembly includes a holder mount bar attached at the support bar, and wherein each of the swivel assemblies includes:
 a swivel post received by, and pivotal about another generally vertically-aligned axis With respect to, the holder mount bar;
 a bracket support attached by a fastener extending through an opening in the swivel post; and
 bracket attached by the fastener to the bracket support, wherein the bracket receives one or more of the plurality of flexible lines against the bracket support.

11. A support assembly to carry a plurality of flexible lines associated with operation of an agricultural implement, the agricultural implement including a main frame bar pivotal about a platform between an extended, operative position and a stowed position for transport, the support assembly comprising:
 a mounting bracket pivotally coupled about a vertical axis to the agricultural implement, the mounting bracket having an upper portion and a lower portion and vertically aligned portion extending therebetween, both the upper and lower portions generally horizontally aligned;
 a support arm pivotally having a first end opposite a second end, the first end pivotally coupled to pivot about the vertical axis with respect to the platform; and
 a holder assembly connected to the second end of the support arm, the holder assembly configured to receive the plurality of flexible lines,
wherein the upper portion of the mounting bracket is pivotally coupled at the main frame bar to pivot about the vertical axis with respect to the main frame bar, wherein the lower portion of the mounting bracket is attached at a different location on the support arm between the first and second ends of the support arm, and
wherein the support assembly carries the plurality of hoses from the platform as the main frame bar pivots about the platform.

12. The support assembly as recited in claim 11, further comprising a mount extending from the main frame bar, the upper portion of the mounting bracket and the first mount both include an opening extending therethrough to receive a pin therethrough pivotally coupling the mounting bracket to the main frame bar about the vertical axis.

13. The support assembly as recited in claim 11, further comprising a mount plate located between the main frame bar and the platform, the first end of the support arm pivotally attached at the mount plate.

14. The support assembly as recited in claim 13, wherein the first end of the support arm and the mount plate both include an opening therethrough to receive a pin pivotally coupling the support arm to pivot about the vertical axis with respect to the second mount.

15. The support assembly as recited in claim 14, wherein the holder assembly is attached at the second end of the support arm.

16. The support assembly as recited in claim 11, further comprising a mount extending from the main frame bar, wherein the upper portion of the mounting bracket and the first mount both include an opening extending therethrough to receive a pin pivotally coupling the mounting bracket to the main frame bar about the vertical axis.

17. The support assembly as recited in claim 11, wherein the generally vertical aligned portion of the mounting bracket limits rotation of the support assembly about the vertical axis relative to the main frame bar.

18. The support assembly as recited in claim 11, wherein the holder assembly includes at least one swivel assembly configured to hold one or more of the plurality of flexible lines.

19. The support assembly as recited in claim 11, wherein the holder assembly includes a plurality of swivel assemblies, wherein each of the plurality of swivel assemblies pivots independently with respect to others in the plurality of swivel assemblies.

20. The support assembly as recited in claim 19, wherein the holder assembly includes a holder mount bar attached at the support bar, and wherein each of the swivel assemblies includes:
 a swivel post received by, and pivotal about another generally vertically-aligned axis with respect to, the holder mount bar;
 a bracket support attached by a fastener extending through an opening in the swivel post; and
 bracket attached by the fastener to the bracket support, wherein the bracket receives one or more of the plurality of flexible lines against the bracket support.

* * * * *